UNITED STATES PATENT OFFICE.

FERDINAND HEBERLEIN, OF LONDON, ENGLAND.

TREATMENT OF ORES PREPARATORY TO SMELTING SAME.

No. 844,355.　　　　　Specification of Letters Patent.　　　　Patented Feb. 19, 1907.

Application filed January 9, 1906. Serial No. 295,257.

*To all whom it may concern:*

Be it known that I, FERDINAND HEBERLEIN, of 18 Leadenhall street, in the city of London, England, a subject of the German Emperor, have invented certain new and useful Improvements in the Treatment of Metalliferous Ores or Compounds Preparatory to Smelting the Same, of which the following is a specification.

This invention relates to the treatment of fine manganese or iron ore, burnt pyrites, blast-furnace flue-dust, and other metalliferous substances in a pulverulent condition.

When manganese, iron, and other ores in a pulverulent condition are treated in a blast-furnace, considerable difficulties are met with, owing to the tendency of the fine ore to "pack" in such a manner as to interfere with the passage of the air and gases generated, as also to form arches, the working of the furnace becoming in consequence irregular.

According to my improved method of treating materials of the character referred to I mix the fine manganese or other ore with coal or other suitable fuel and subject the mixture after ignition to a blast of compressed air. A rapid development of heat takes place, and a sufficiently high temperature is attained to bring about a fusion and agglomeration of the ore under treatment. The volatilizable substances being, moreover, liberated, concentration of the metallic contents takes place.

The process may be conveniently carried out in a tip apparatus, such as is generally used in the Huntington-Heberlein process for roasting sulfids. On the perforated iron saucer at the bottom of the receiver is placed a small quantity of live fuel, and upon this is arranged a thin layer of the mixture of ore and fuel. A gentle air-blast is then applied and as the process proceeds is gradually increased, the receiver having in the meantime been filled.

The combustion propagates itself from the bottom upward, with the result that the substances become agglomerated, there being left in the receiver at the conclusion of the operation a slagged and porous mass ready for tipping and subsequent treatment. When the subsequent treatment is carried out in a blast-furnace, the porous condition and lumpy state of the product facilitates the passage of the air-blast and other gases and enables regular and economical working to take place.

I have further found that where the mixture is devoid of moisture it is advantageous to add a certain quantity of water, which not only tends toward the prevention of flue-dust formation, but greatly assists in the regular diffusion of the blast throughout the entire mass and in the production of a homogeneous and uniformly well-slagged porous product.

As a rule ores of the character referred to can be treated without the addition of fluxes; but in some instances it is advantageous to add either lime or silica, according to the precise nature of the ore.

What I claim as my invention, and desire to secure by Letters Patent, is—

1. The herein-described process of treating finely-divided metalliferous ores or compounds with a view to the production of an agglomerate containing the ore in the form of an oxid; said process consisting in mixing the fine ore or compound with any suitable fuel whence the heat necessary in sintering the ore is derived, subjecting the mixture, after ignition, to a blast of compressed air and thereby eliminating the said fuel (including sulfur, if any) and producing a porous agglomerate in the form of an oxid, substantially as set forth.

2. The herein-described process of treating finely-divided metalliferous ores or compounds with a view to the production of an agglomerate containing the ore in the form of an oxid; said process consisting in mixing the fine ore or compound with any suitable fuel whence the heat necessary in sintering the ore is derived, moistening the mixture, subjecting it, after ignition, to a blast of compressed air and thereby eliminating the said fuel (including sulfur, if any) and producing a porous agglomerate in the form of an oxid, substantially as set forth.

In testimony whereof I have signed my name to this specification in the presence of two subscribing witnesses.

FERDINAND HEBERLEIN.

Witnesses:
　H. D. JAMESON,
　F. L. RAND.